(12) United States Patent
Biskeborn et al.

(10) Patent No.: US 9,741,367 B1
(45) Date of Patent: Aug. 22, 2017

(54) FABRICATION OF A TAPE HEAD WITH A MONOBLOC CLOSURE

(71) Applicant: International Business Machines Corporation, Armonk, NY (US)

(72) Inventors: Robert G. Biskeborn, San Jose, CA (US); Johan Engelen, Rueschlikon (CH); Mark A. Lantz, Rueschlikon (CH); Hugo E. Rothuizen, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/041,737

(22) Filed: Feb. 11, 2016

(51) Int. Cl.
*G11B 5/187* (2006.01)
*G11B 5/10* (2006.01)
*G11B 5/008* (2006.01)
*G11B 5/31* (2006.01)
*G11B 5/127* (2006.01)

(52) U.S. Cl.
CPC ........ *G11B 5/1871* (2013.01); *G11B 5/00813* (2013.01); *G11B 5/102* (2013.01); *G11B 5/1272* (2013.01); *G11B 5/3163* (2013.01); *Y10T 29/4903* (2015.01); *Y10T 29/49032* (2015.01)

(58) Field of Classification Search
None
See application file for complete search history.

(56) References Cited

U.S. PATENT DOCUMENTS

| | | | |
|---|---|---|---|
| 5,251,084 A * | 10/1993 | Nanjyo et al. | G11B 5/105 360/271.5 |
| 5,652,015 A | 7/1997 | Aboaf et al. | |
| 6,021,013 A | 2/2000 | Albrecht et al. | |
| 6,947,256 B2 | 9/2005 | Biskeborn et al. | |
| 8,009,386 B2 | 8/2011 | Hachisuka | |
| 8,014,100 B2 | 9/2011 | Biskeborn et al. | |
| 8,373,944 B2 | 2/2013 | Biskeborn | |

OTHER PUBLICATIONS

Biskeborn, R. G., et al., "Flat-profile tape recording head", IEEE Transactions on Magnetics, Oct. 2002, 1 page of abstract.
Biskeborn, R. G., et al., "Hard-disk-drive technology flat heads for linear tape recording", IBM Journal of Research and Development, 2003, 1 page of abstract only.

* cited by examiner

*Primary Examiner* — Craig A. Renner
(74) *Attorney, Agent, or Firm* — Harrington & Smith

(57) ABSTRACT

A tape head including a body with a tape-bearing surface configured to contact a magnetic tape, at least one transducer that is a read or write element, configured so the tape head may read from or write to the tape, in operation; and a monobloc closure with a structured cross-sectional profile, so as to exhibit: contact part, fixed on a side of the body which adjoins the tape-bearing surface at an edge thereof, the contact part having a top surface level with the tape-bearing surface; and connecting part integral with the contact part, the connecting part having a top surface recessed from the contact part's top surface, perpendicularly to a contact plane defined by the tape-bearing surface, so the connecting part's top surface does not contact the tape, in operation; and a broken line of mechanical weakness that extends at an end of the top surface of the connecting part.

20 Claims, 4 Drawing Sheets

US 9,741,367 B1

FABRICATION OF A TAPE HEAD WITH A MONOBLOC CLOSURE

BACKGROUND

The invention relates in general to methods of fabrication of tape heads, and more specifically to the fabrication of planar tape heads. In particular, the invention concerns a tape head having a closure defining a skiving edge, where the closure is obtained without having to resort to a lapping process.

Various data storage media or recording media such as magnetic tape, magnetic disks, optical tape, optical disks, holographic disks or cards, and the like are known which allow for storage and retrieval of data. In particular, in magnetic media, data are typically stored as magnetic transitions, i.e., they are magnetically recorded in the magnetic layer of the media. The data stored is usually arranged in data tracks. A typical magnetic storage medium, such as a magnetic tape, usually includes several data tracks. Data tracks may be written and read individually, or sets of data tracks may be written and read in parallel depending. Transducer (read/write) heads are positioned relative to the data tracks to read/write data along the tracks. To this aim, a tape drive head must locate each data track and accurately follow its path. To achieve this, servo techniques have been developed which allow for a precise positioning of the head relative to the data tracks. One such technique makes use of servo patterns, that is, patterns of signals or recorded marks on the medium, which are tracked by the head. The servo patterns are recorded on the recording medium such as to provide a position reference for the data tracks. In other words, a servo head reads a servo pattern, which is then interpreted by a servo channel into a position error signal (PES). The latter is then used to adjust the distance of the servo head relative to the servo pattern and thereby ensure a proper positioning of the transducers with respect to the set of data tracks.

Essentially two technologies have been developed for timing-based servo patterns. The first one makes use of surface thin film servo writers, as discussed in, e.g., U.S. Pat. No. 6,021,013. The second technology relates to so-called "pure thin film planar servo writers", see, e.g., U.S. Pat. No. 5,652,015, U.S. Pat. No. 6,947,256, and U.S. Pat. No. 8,014,100. Pure thin film planar servo writers potentially have several advantages over surface thin film servo writers, such as improved servo format quality, increased servo formatting speed, increased servo pattern design flexibility and reduced fabrication costs.

SUMMARY

According to a first aspect, the present invention is embodied as a method of fabrication of a tape head with a monobloc closure. This method relies on a body (comprising the tape-bearing surface) and a closure. The tape-bearing surface is configured to contact a magnetic tape, in operation. The body comprises at least one transducer, which is a read element or a write element. This element is configured so as for the tape head to be able read from or write to the tape, in operation. The closure has a structured cross-sectional profile, so as to exhibit: a contact part (having a first top surface); a breakable part (having a second top surface); and a connecting part, which connects the breakable part to the contact part. The connecting part has a third top surface that is recessed from said first top surface, perpendicularly to a contact plane defined by said tape-bearing surface, so as for the third top surface not to contact the tape, in operation. The connecting part further comprises a line of mechanical weakness extending across said third top surface. The body and the closure are arranged on a reference surface, so as for each of the tape-bearing surface, the first top surface and the second top surface to contact the reference surface. Next, the contact part is fixed on a side of the body, which side adjoins the tape-bearing surface at an edge thereof. Finally, the breakable part is removed by breaking along the line of mechanical weakness. This makes it possible to obtain a tape head wherein said first surface is level with the tape-bearing surface.

According to another aspect, the invention is embodied as a tape head, obtainable according to a fabrication method such as described above. The tape head comprises a body and a monobloc closure as described above, where the contact part has a top surface level with the tape-bearing surface. As the breakable part is removed, the resulting tape head shows a broken surface along a line of mechanical weakness that extends at an end of the connecting part.

According to a final aspect, the invention is embodied as a tape head apparatus for recording and/or reproducing multi-track tapes, which apparatus comprises a tape head as described above.

Devices, apparatuses, and fabrication methods embodying the present invention will now be described, by way of non-limiting examples, and in reference to the accompanying drawings.

Figure 1:
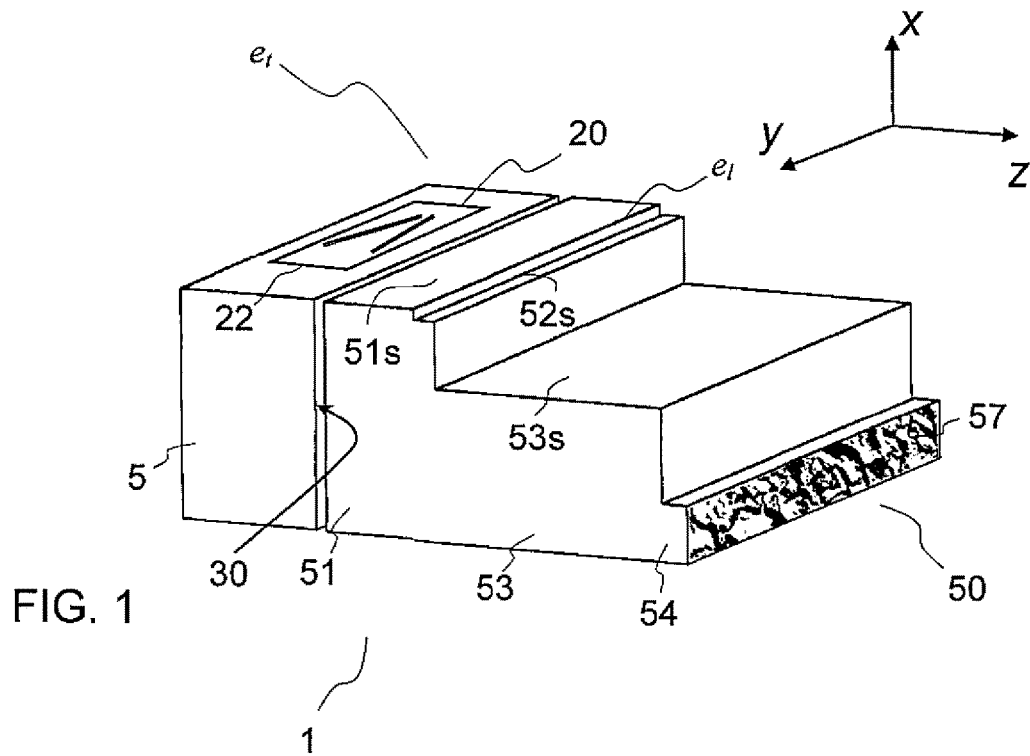
FIG. 1 is a 3D view of a planar tape head (a servo writer), according to embodiments.

The accompanying drawings show simplified representations of devices or parts thereof, as involved in embodiments. Technical features depicted in the drawings are not to scale. In particular, the scales assumed for axes x and z differ. Similar or functionally similar elements in the figures have been allocated the same numeral references, unless otherwise indicated.

DETAILED DESCRIPTION OF EMBODIMENTS OF THE INVENTION

As it can be realized, the second technology ("pure thin film planar servo writers") referenced in the background section may substantially suffer from friction and wear. Friction is problematic as it results in velocity variations during servo formatting that cause written-in velocity noise and degrade servo performance. Wear of the servo writer is also problematic as it limits the useful lifetime of a servo write head.

The wear robustness of a planar tape head can be significantly improved by mounting a hard ceramic "closure" on the leading edge (for asymmetrically wrapped heads with a trailing edge wrap angle of <0 degrees) or on both the leading and trailing edges for heads used in combination with a positive wrap angle on both the leading and trailing edges. In order to assure good contact between the tape and planar servo writer, the skiving edge should be sharp and the tape bearing surfaces of the closure(s) and the planar head should be co-planar. Such closures are already known from their use in flat profile read/write heads in tape drives (see "Hard-disk-drive technology flat heads for linear tape recording" R. Biskeborn and J. Eaton, IBM Journal of Research and Development, Volume: 47, Issue: 4 pp 385-400, and "Flat-profile tape recording head", R. Biskeborn and J. Eaton, IEEE Transactions on Magnetics, Volume: 38, Issue: 5, pp 1919-1921).

Such heads are manufactured by gluing a closure on the edge of a tape head chip and lapping to achieve a flat planar tape bearing surface. Good alignment (co-planarity) between the tape bearing surface of the closure and the head chip is required to ensure good tape-head contact (i.e., a low spacing therebetween). For read/write heads, planarity can be achieved by lapping of the head chip and the closure to a flat surface. In addition to making the surfaces flat and planar, the lapping process has the added benefit of creating a sharp skiving edge on the closure. Unfortunately, this process is not practical for use with planar heads as the lapping process will damage the planar write transducers. More generally, lapping may cause damages to a tape-bearing surface.

Having realized these potential issues, present inventors have developed methods for mounting a closure onto a planar servo writer, where the closure is profiled such as to make it possible to reach co-planarity with the surface of the tape bearing, without resorting to a lapping process. They have further devised methods to manufacture such a profiled closure with a sharp skiving edge and, in particular, methods to design closures so as to reduce the friction between tape and the tape head.

The present solutions can notably find applications for planar servo writers (e.g., thin film planar servo writers). However, and the one skilled in the art may appreciate, the present solutions may potentially apply to any type of tape heads and, in particular, to planar data heads for use in tape drives.

Figure 4:
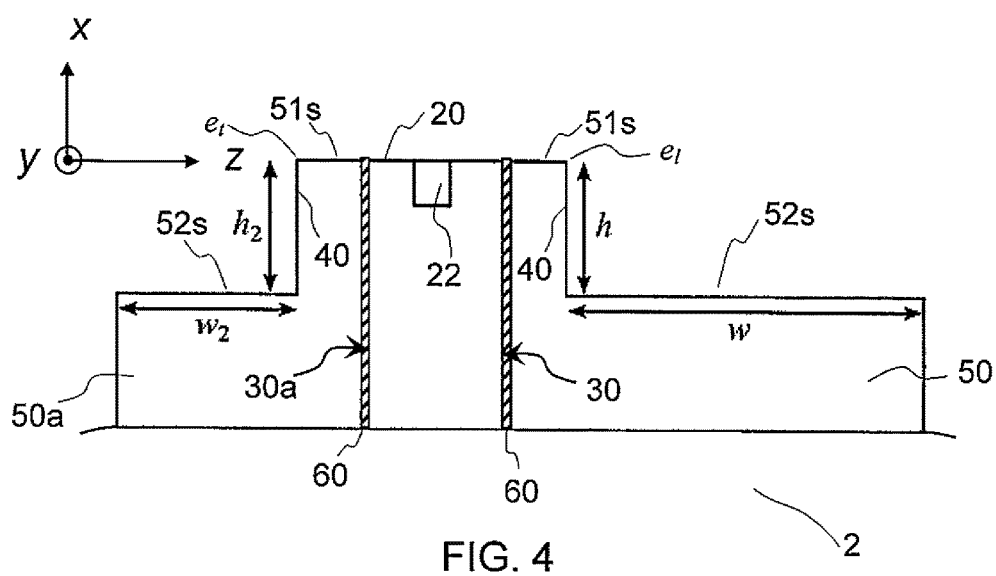
FIG. 4 is a 2D cross-sectional view of an asymmetric tape head having two monobloc closures, according to other embodiments.
Figure 5:
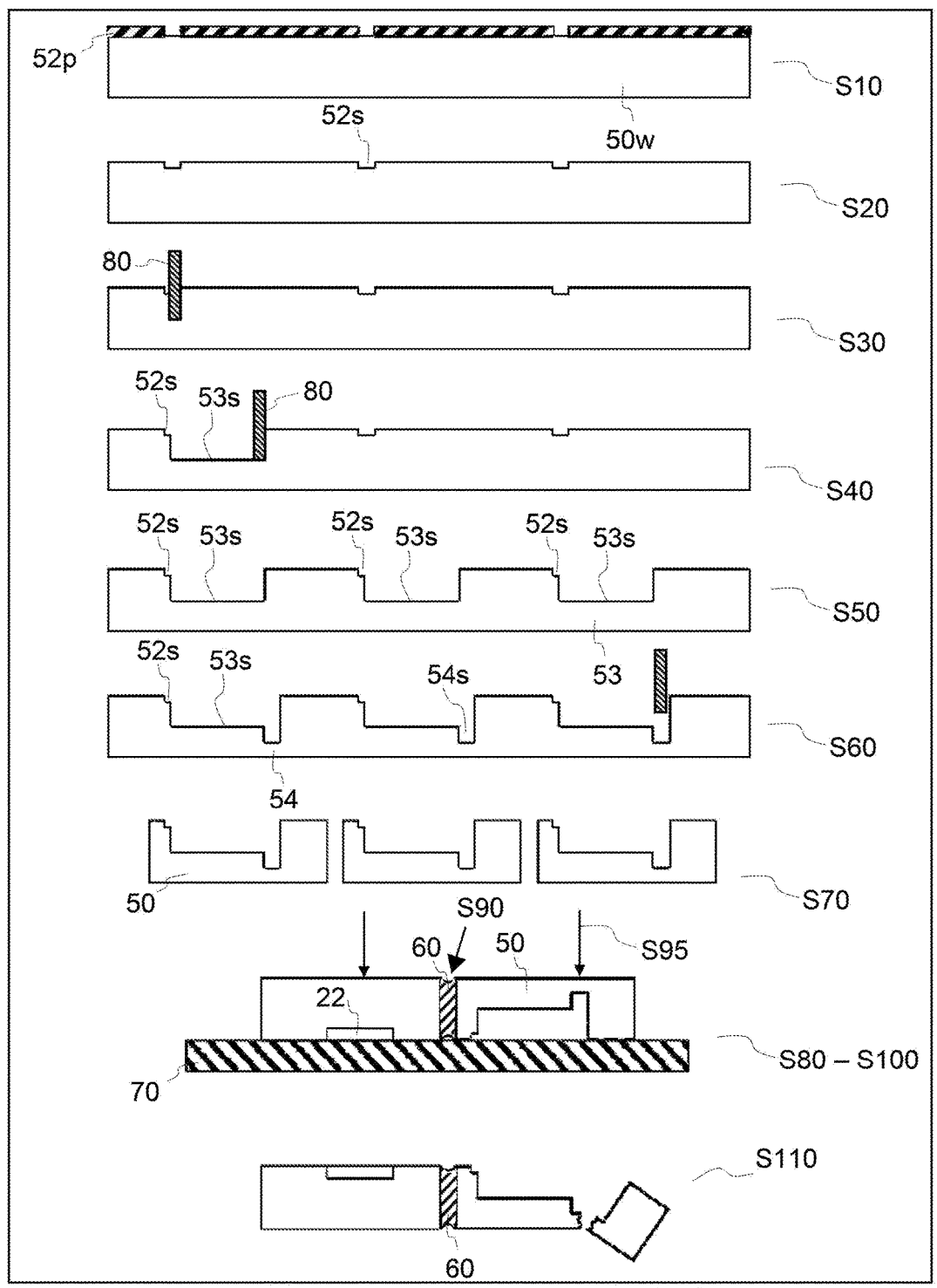
FIG. 5 is a sequence illustrating high-level fabrication steps of a planar tape head as in FIG. 1, according to embodiments.

In reference to FIG. 5 (and additionally to FIGS. 1-4), an aspect of the invention is first described, which concerns a method of fabrication of a tape head 1, 2 with a closure.

Basically, this method makes use of a tape bearing body 5 and a monobloc closure 50, 50a. The body 5 exhibits a tape-bearing surface 20, which is the surface meant to contact the magnetic tape 10, in operation. The body comprises at least one transducer 22 (or, if necessary, a set of transducers [not shown]). The transducer 22 can be a read or a write element. It is in all cases configured in the tape head body so as for the tape head to be able to read from or write to the tape 10, in operation. Such a transducer is preferably partly buried in the body, the top poles of the magnetic yoke of the transducer being in-plane with the tape-bearing surface, as assumed in the accompanying drawings.

Figure 2:
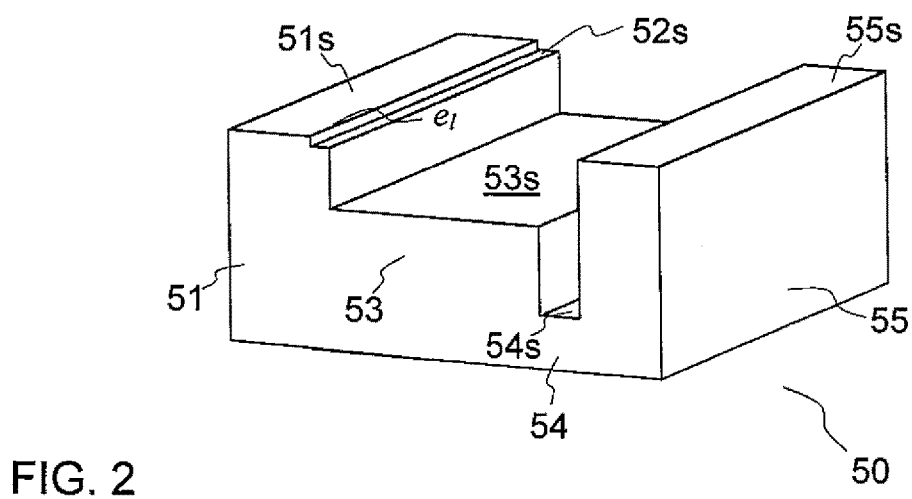
FIG. 2 is a 3D view of a monobloc closure, as used to fabricate a planar tape head as in FIG. 1, according to embodiments.

The monobloc closure 50, 50a needs to be specifically profiled for the purpose of the present methods. It has a structured cross-sectional profile, so as to exhibit various parts 51, 53, 55, as depicted in FIG. 1 or 2. It notably comprises a contact part 51, which exhibits a top surface 51s, as well as a breakable part 55, whose top surface is referred to by reference 55s. A middle part 53 mechanically connects the breakable part 55 to the contact part 51. The connecting part 53 is integral with the flanks 51, 55 but has a line 54, 54s of mechanical weakness, which line extends across a top surface 53s of the connecting part 53.

Different approaches can be used to weaken the part 53, e.g., partial cut, regularly spaced holes (blind or through-holes), chemical process, etc. Weakening the connecting part is needed so that later the part 55 can be broken off.

Next, the body 5 and the closure 50, 50a are arranged (step S80 in FIG. 5) on a reference surface 70, so as for each of the tape-bearing surface 20, the first top surface 51s and the second top surface 55s to contact the reference surface 70. If the two lateral flanks have a same height, then the reference surface 70 needs to be flat, so as for each of the surfaces 51s and 55s to be level with the tape-bearing surface 20; the top surface 55s of the breakable flank serves to obtain a correct orientation of the surface 51s (both surfaces are level with each other, by design). In variants, asymmetric flanks 51, 55 (or more generally non-level surfaces 51s, 55s) may be used but the reference surface 70 must, in all cases, be consistent with the design of the closure 50, 50a, so as to eventually obtain a surface 51s that is level with the tape-bearing surface 20.

The reference surface may for instance be a glass plate or any other hard, transparent material, in which case the first top surface 51s and the tape-bearing surface 20 can be viewed using an inverted microscope. Namely, interference fringes can be observed to verify the co-planarity of the two surfaces and adjust the alignment (and possibly a load or pressure applied onto the elements 5, 50, 50a) before fixing.

Then, the contact part 51 is fixed at steps S90-S100 on a side 30, 30a of the body 5. This side 30, 30a adjoins the tape-bearing surface 20 at an edge $e_l$, $e_t$ thereof. The structured closure 50, 50a may for instance be fixed on a leading side (on the side of the leading edge $e_l$) and/or a trailing side (on the side of the trailing edge $e_t$) of the body. A curable glue 60 is preferably used to that aim.

Finally, the breakable part is removed at step S110 by breaking the connecting part along the line 54, 54s of mechanical weakness.

Note that, in the accompanying drawings, the line 54, 54s of mechanical weakness is systematically located on the middle, transversal part 53. Still, the one skilled in the art will appreciate that this line 54, 54s may actually be located on the lateral flank 55, so as to be able to break a portion of this flank 55. In such variants, the breakable portion of the flank 55 would nevertheless be coupled to the contact part 51 via a connecting part (the latter comprising a lower, residual portion of the flank 55, in addition to the transversal part 53).

In all cases, breaking this line 54, 54s makes it possible to eventually obtain a tape head wherein the first surface 51s is level with the tape-bearing surface 20. Still, the top surface 53s of the connecting part 53 is, by design, recessed from the surface 51s, perpendicularly to the contact plane (y, z) defined by the tape-bearing surface 20, so as for the surface 53s not to contact the tape, in operation.

The above method allows the closure 50, 50a to be machined independently from the body 5. This makes it easier to obtain a desired shape for the closure, e.g., with appropriate (sharp) skiving edges. The closure 50, 50a is later fixed to the body 5 and, thanks to the reference surface 70 and the outermost flank 55, the top surface 51s can be made level with the tape bearing surface 20. This, advantageously, does not require any lapping process, which may damage the tape-bearing surface 20. This is especially beneficial for planar tape heads, where transducers are in-plane with the planar tape-bearing surface, as assumed in the accompanying drawings.

Figure 6:
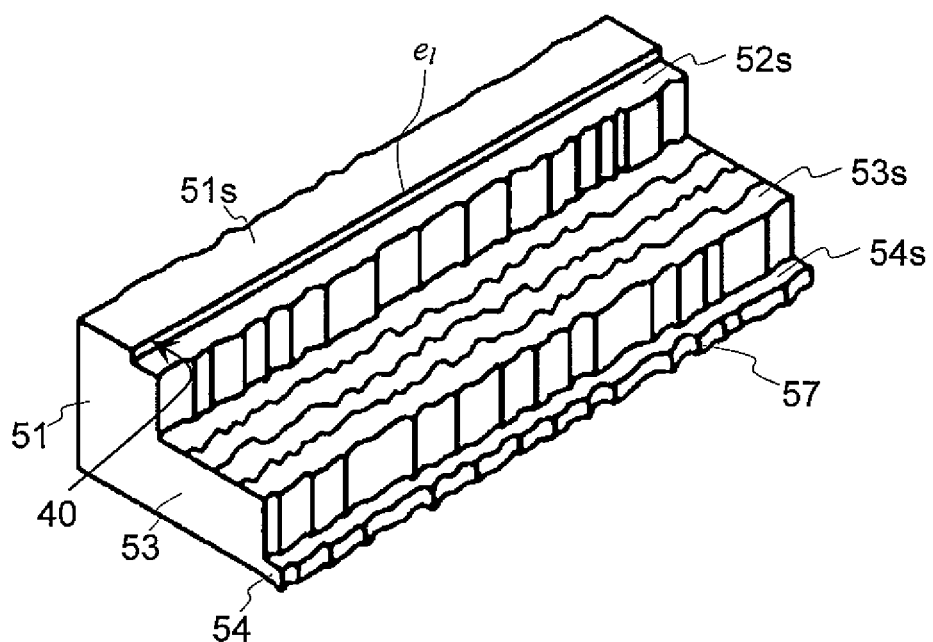
FIG. 6 schematically depicts a closure as obtained after step S110 of FIG. 5.

Removing the breakable part 55 by breaking along the line 54, 54s of mechanical weakness typically results in fracture marks 57 on the connecting part 53, as depicted in FIG. 1 or 6.

Figure 3:
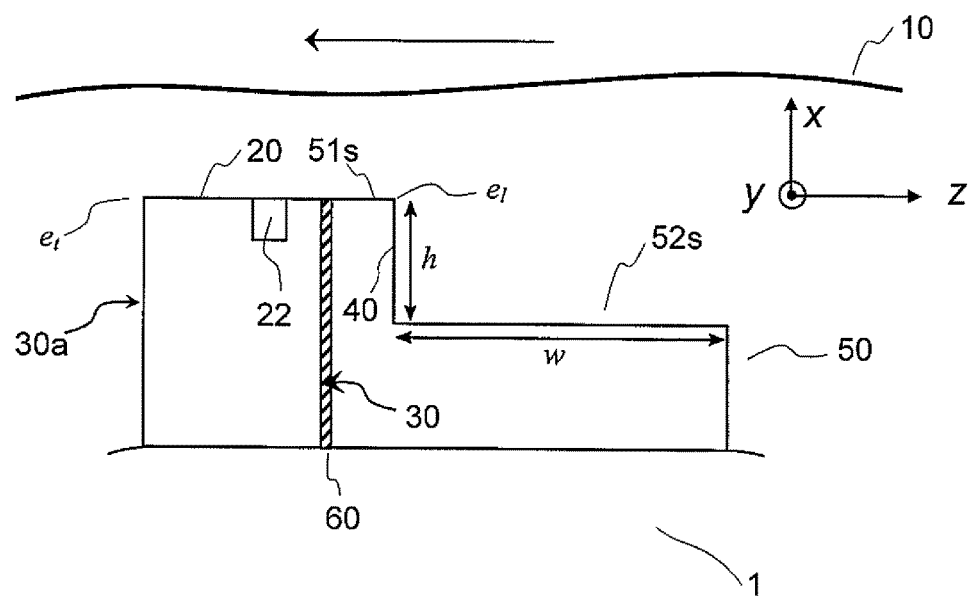
FIG. 3 is a 2D cross-sectional view of a (portion of a) tape head such as depicted in FIG. 1.

As schematically illustrated in FIGS. 1 and 3, the side 30 of the body 5 onto which a closure 50 is fixed may be a leading side 30 (corresponding to leading edge $e_l$), assuming a tape direction parallel to the axis z, as in FIG. 3. In variants, two closures 50, 50a (each having a structured profile as described above) may be fixed on each side 30, 30a, respectively corresponding to the leading edges $e_l$ and the trailing edge $e_t$, as depicted in FIG. 4. The leading side 30 and the trailing side 30a adjoin, each, the tape-bearing surface 20 at a respective edge $e_l$, $e_t$ thereof. In still other variants, a single closure 50a may be provided on the trailing side 30a only, for reasons explained later.

Referring now to FIG. 5: in embodiments, the monobloc closure(s) 50, 50a may be structured S10-S20, so as to obtain a step-like cross-sectional profile for the contact part 51 in the plane (x, z). In particular, a sharp, skiving edge $e_l$, $e_t$ may be desired, as best seen in FIGS. 3, 4. A suitable, step-like cross-sectional profile may for instance exhibit a riser 40 (FIGS. 3, 4) between two treads, which are respectively formed by the first top surface 51s and the recessed surface 52s. The latter is recessed from the first top surface 51s so as not to contact the magnetic tape 10, in operation. In particular, and referring now more specifically to FIGS. 3, 4, the closures 50, 50a may be structured at steps S10-S30 so as for the recessed surface 52s to be recessed from the first top surface 51s by a distance h (corresponding to the height of the riser 40), the width w of the recessed surface 52s (along a direction z parallel to the longitudinal direction of circulation of the tape) being chosen so as to ensure a desired wrap angle, as explained later in detail.

Referring back to FIG. 5, the cross-sectional profile of a closure 50, 50a may, in embodiments, be structured as follows. First, a substrate 50w is provided, which is then coated S10 with a photoresist 52p. The photoresist 52p is lithographically patterned S10, to first create notches 52s, at positions corresponding to the step 51s–40–52s to be subsequently created (see FIGS. 3, 4). The photoresist pattern accordingly obtained is transferred S20 into the substrate 50w, to obtain a clean, step-like cross-sectional profile 51s–40–52s for the contact part 51.

The substrate 50w may for instance be an Aluminum-Titanium carbide substrate, or AlTiC substrate (e.g., a wafer that essentially comprises Al, Ti and C elements, in an $Al_2O_3$—TiC composition). As known per se, the photoresist pattern can be transferred into the AlTiC substrate by reactive ion etching. Such a process results in clean step-like structures.

In embodiments, the connecting part 53 is obtained by cutting S40 partially through a depth of the provided substrate 50w with a wafer saw 80, up to a level desired for said third top surface 53s. As illustrated in FIG. 5, wide notches 52s may initially be provided, step S20, and sawing is started S30 at the level of a notch 52s, at an end thereof (the width of a notch being larger than the thickness of the saw 80). Eventually, a clean, step-like structure is obtained at step S40 for the part 51, and hence a clean skiving edge (see FIG. 6). Sections of the wafer 50w are typically removed using repeated passes of the wafer saw 80 to cut partially through the depth of the wafer, as illustrated in FIG. 5, step S40. Preferably, several closures 50 are machined in parallel at steps S10-S60.

Note that a skiving edge may in principle be created by cutting the substrate 50w with a wafer saw. However, the edge that results is typically rough and may furthermore be chipped by the cutting process. In contrast, the etching process described above in reference to steps S10-S20 of FIG. 5 produces clean and sharp skiving edges, as schematically illustrated in FIG. 6.

Next, the line 54, 54s of mechanical weakness is preferably obtained by cutting partially through a depth of the obtained connecting part 53, through the third top surface 53s, e.g., using the same saw 80 as before, as depicted in FIG. 5, step S60. This results in a recessed surface 54s, forming a trench in part 54. As mentioned earlier, one may, in variants, punch regularly spaced holes (blind or through holes). Various mechanical weakening techniques are otherwise known, including chemical processes. However, using a wafer saw is certainly the simplest, especially if the saw 80 as used at steps S30-S40 can be re-used.

Preferably, the substrate 50w is cut at step S60 partially so as to obtain a residual thickness of the connecting part 53 (at the level of the weak line 54, 54s) that is typically between 30 and 70 microns, to ease the subsequent breaking at step S110. No specific tool is needed to break the part 55, e.g., a mere scalpel may be used to achieve this. Namely, after having placed the body 5 and the closure 50 on a support, one can push on the breakaway part 55 with a sharp scalpel, preferably equally along the full width of part 55, to get a clean, one-time break.

In embodiments, the closure is fixed at steps S90-S100 by first applying at step S90 a glue 60 on the outer side of the contact part 51 (and/or on a side 30, 30a of the body 5) and then by contacting the elements and subsequently curing the glue 60 at step 100. One may for instance use a thermosetting adhesive/coating (epoxy resin). The glue 60 used should provide adequate stiffness after curing. Preferably, the glue is electrically conducting after curing, so that the closure and the head substrate are at the same electrical potential and the closure is automatically grounded with the head substrate.

The final fixation steps (contacting and curing, S100) are preferably performed while applying, at step S95, a (small) load or pressure on the body 5 and the closure 50 arranged at step S80 on the reference surface 70, to ensure a correct orientation of the surfaces 20 and 51s. If necessary, the orientation of the closure and/or the body may be corrected, based on observations from an inverted microscope, as mentioned earlier. Once the glue is cured, the outer part 55 can be removed, step S110.

FIG. 6 schematically depicts an object as obtained after step S110 of FIG. 5 (only the closure is depicted though, for conciseness). As illustrated in FIG. 6, the etched edge $e_l$ is sharp (in fact all the step profile 51s–40–52s is clean), while other edges and surfaces as obtained by sawing are logically rougher.

Referring now more specifically to FIGS. 1-4: according to another aspect, the invention can be embodied as a tape head 1, 2. The tape head 1, 2 can typically be obtained by the fabrication methods as described above. Consistently with the fabrication methods discussed above, tape heads according to embodiments shall most generally be designed for reading and/or writing to a magnetic tape 10, via the tape-bearing surface 20, which surface contacts the tape 10, in operation of the tape head. The body 5 comprises at least one transducer 22. In addition, the tape head comprises one or two structured, monobloc closure(s) 50, 50a, e.g., fixed to the body according to methods described before. Such a closure has a structured cross-sectional profile, so as to exhibit a contact part 51, fixed on a side 30, 30a of the body 5, which side adjoins the tape-bearing surface 20 at an edge $e_l$, $e_t$ thereof. Consistently with the preferred fabrication methods discussed earlier, the contact part 51 has a top surface 51s that is level with the tape-bearing surface 20. The connecting part 53 is integral with the contact part 51 and has a top surface 53s recessed from the top surface 51s of the contact part 51, so that the surface 53s does not to contact the tape 10, in operation (to reduce friction, damages to the tape and wear of the head).

The connecting part 53 of a closure 50, 50a further shows a broken line 54, 54s of mechanical weakness, i.e., a broken mechanical element 54 extending along direction y in FIG. 1, at a distal end of the connecting part 53. The connecting part 53 may for instance exhibit fracture marks 57 at a level of the broken element 54. Fracture marks may notably include residual marks of breakage, such as cleavage planes or parting breaks, etc., depending on the material used for the closure and the process used to break the part 55.

As mentioned earlier, the closure 50, 50a may be mounted on the leading side 30 or the trailing side 30a of the body 5, each of said sides 30, 30a adjoining the tape-bearing surface 20 at a respective edge $e_l$, $e_t$ thereof, see FIGS. 3-4.

As per the above design, the tape-bearing surface 20 and the adjoining surface(s) 51s form an area that is essentially flat. This area is generally configured to contact the tape 10, in operation. The surface 20 comprises at least one transducer 22, which may be a read or a write element, i.e., an element configured in the tape head to respectively read or write to the magnetic tape 10, in operation.

Still, the tape-bearing surface 20 shall typically include several transducers. The tape-bearing surface 20 is furthermore preferably planar. I.e., the body 5 comprises one or more in-plane transducers 22, which are partly buried in the body. Top poles of the transducers are mounted front-flush so as for the surface 20 to be essentially flush.

As discussed earlier too, the monobloc closure 50, 50a may have a step-like cross-sectional profile, exhibiting a riser 40 between two treads 51s, 52s, as respectively formed by the top surface 51s and the recessed surface 52s. In embodiments, the surface 52s is recessed from the top surface 51s by a distance h, whereas the width w of the recessed surface 52s along direction z (parallel to the direction of circulation of the tape) is such as to ensure that a desired wrap angle can be obtained. E.g., for a given, desired wrap angle α, the ratio h/w should be larger than or equal to tan(c), else the tape may touch the edge of 52s. For instance, h=2 μm, and w=50 μm may typically be used. Smaller values of w (e.g., 10 or 201 μm can be obtained). The value of w is ideally as small as possible. The closure 50, 50a is preferably fabricated from an AlTiC substrate, as discussed earlier.

Because of the riser 40, the recessed surface 52s is recessed from the contact area 20+51s by a distance h that corresponds to the height of the riser 40, i.e., along x. The riser 40 and, more generally, the step-like structure 51s–40–52s can notably be obtained according to methods described earlier in reference to FIG. 5, which allow sharp, skiving edges $e_l$, $e_t$ to be obtained.

Note that the drawings are not to scale; in particular, in FIGS. 3, 4, the scales along axes x and z differ, for the sake of depiction).

The distance h is ideally as small as possible and, in practice, preferably between 1 and 10 microns, to ease the transfer process (step S20, FIG. 5). More preferably, the distance h shall be between 3 and 7 microns. Suitable widths w for the recessed surface 52s shall typically be between 10 and 50 microns.

Possible ranges of for dimensions for the head components follow:

The length of the leading edge $e_l$ (along axis y) preferably corresponds to the length of the head and is preferably larger than the width of the tape (e.g., 0.5 inch);

The width of the recessed surface 52s (along z) is preferably between 10 and 50 μm it is ideally as small as possible).

The width of the first top surface 5 is (along z) is preferably between 20 and 200 μm, and is more preferably larger than 100 μm so that the tape 10 may land on the closure.

The total width of the connecting part 53 (along z) is preferably of (approximately) 2 mm;

The width of the trench 54s (along z) is preferably ~150 μm, depending on the saw blade width; and The width of the second top surface 55s (along z) is preferably ~200 μm.

Present tape heads 1, 2 may exhibit one (FIG. 3) or two (FIG. 4) recessed surfaces 52s. In FIG. 4, the tape head 2 exhibit two recessed surfaces 52s, i.e., one on the trailing side 30a and one on the leading side 30 of the tape-bearing surface 20. In FIG. 4, the recessed 52s surface on the trailing side 30a is recessed from the tape-bearing surface 20 by a distance $h_2$ and has a width $w_2$ along z, $h_2$ and $w_2$ being here again appropriately chosen so as to prevent the tape (or at least substantially lower the chance for it) to be pushed back onto the recessed surface 52s on the trailing side 30a, in operation of the tape head. Again, the distance h shall advantageously be between 1 and 10 microns. The fabrication of the head will be greatly facilitated if the distances h and $h_2$ are chosen equal and, a fortiori, if similar closures 50 and 50a are used. Yet, asymmetric heads may be desired, in variants, depending on the desired wrapping of the tape 10.

Tape heads 1, 2 as described herein are preferably planar servo write heads, i.e., planar heads comprising at least one transducer (writer) 22, with in-plane top poles. Present tape heads 1, 2 can notably be used in tape head apparatuses for recording and/or reproducing multi-track tapes. The present invention can accordingly be embodied as such an apparatus.

The above embodiments have been succinctly described in reference to the accompanying drawings and may accommodate a number of variants. Several combinations of the above features may be contemplated. Examples are given below.

The fabrication and assembly process is preferably as follows. First concerning the fabrication of the closure: an AlTiC wafer is provided that is coated with a photoresist, and lithographically patterned, step S10. Then, S20: the pattern is transferred into the AlTiC wafer by reactive ion etching, creating a sharp edge $e_l$ (FIG. 6) which will later act as a skiving edge, in operation. During steps S30-S50: sections of the wafer are removed using repeated passes of a wafer saw to cut partially through the depth of the wafer. At step S60: an additional deeper cut is made with the wafer saw to produce a region with a residual thickness of approximately 50 microns. At step S70: individual, or "row bar", sections of closure are produced by cutting through the full thickness of the wafer. Next, regarding the closure assembly: a planar tape head body 5 (obtained from a wafer chip) and a closure are placed upside-down (i.e., with the write elements and the skiving edge down) on a flat reference surface, S80. In FIG. 5, the planar writer is on the left and the closure is on the write. The two parts are aligned, and glued S90 together under a small applied load. The use of the reference surface assures the co-planarity of the (planar) tape bearing surface and the closure's top surfaces (upside-down). Using, for example, a glass plate (or any other transparent material) for the reference surface, the surfaces of the body and the closure can be viewed using an inverted microscope, to verify the co-planarity of the surfaces and adjust the alignment of the elements, as well as the applied load, if necessary, before gluing. After the glued is cured at step S100, the free, outer flank of the closure is removed at step S110 by breaking the thinned region.

If assembly is performed at the "row bar" level, the row bars can be cut into individual, planar servo-writers in a subsequent step (not shown).

The closure may for instance be fixed on a leading side and/or a trailing side of the body.

Preferably, the monobloc closure is fabricated so as to exhibit a structured cross-sectional profile, whereby the contact part has a step-like cross-sectional profile, with a riser between two treads that are respectively formed by the first top surface and a recessed surface, the latter recessed from the first top surface so as not to contact the magnetic tape, in operation.

As mentioned earlier, said side may be a leading side or a trailing side of the body. Preferably, the contact part of the monobloc closure has a step-like cross-sectional profile, as described above. In particular, the recessed surface may be recessed from the top surface of the contact part by a distance h corresponding to a height of the riser, wherein h between 1 and 10 microns, whereas a width w of the recessed surface along a direction parallel to a longitudinal direction z of circulation of the tape is between 10 and 50 microns.

In preferred embodiments, the tape head is a planar tape head, wherein said transducer is an in-plane transducer, in-plane with the tape-bearing surface. The tape head is preferably a servo writer.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly cited may be used for the wafer 50w used to obtain the closures.

What is claimed is:

1. A tape head, comprising:
  a body with a tape-bearing surface configured to contact a magnetic tape, the body comprising at least one transducer that is a read or write element, configured so as for the tape head to read from or write to the tape, in operation; and
  a monobloc closure, having a structured cross-sectional profile, so as to exhibit:
    a contact part, fixed on a side of the body, which side adjoins the tape-bearing surface at an edge thereof, the contact part having a top surface level with the tape-bearing surface; and
    a connecting part integral with the contact part, wherein the connecting part has:
      a top surface recessed from the top surface of the contact part, perpendicularly to a contact plane defined by said tape-bearing surface, so as for the top surface of the connecting part not to contact the tape, in operation; and
      a broken line of mechanical weakness that extends at an end of the to surface of the connecting part.

2. The tape head of claim 1, wherein
the connecting part exhibits fracture marks at a level of said broken line of mechanical weakness.

3. The tape head of claim 1, wherein
said side is a leading side or a trailing side of the body, wherein said leading side and said trailing side adjoin, each, the tape-bearing surface at an edge thereof.

4. The tape head of claim 1, wherein
the monobloc closure has a structured cross-sectional profile so as for the contact part to have a step-like cross-sectional profile, exhibiting a riser between two treads, the latter respectively formed by the top surface of the contact part and a recessed surface, the latter recessed from the top surface of the contact part so as not to contact the magnetic tape, in operation.

5. The tape head of claim 4, wherein
the recessed surface is recessed from the top surface of the contact part by a distance h corresponding to a height of the riser, wherein h is between 1 and 10 microns, a width w of the recessed surface along a direction parallel to a longitudinal direction z of circulation of the tape being between 10 and 50 microns.

6. The tape head of claim 1, wherein
the monobloc closure is a structured substrate of Aluminum-Titanium carbide substrate.

7. The tape head of claim 1, wherein
the tape head is a planar tape head, said at least one transducer being an in-plane transducer, whose top poles are in-plane with the tape-bearing surface.

8. The tape head of claim 1, wherein
the tape head is a servo writer.

9. A tape head apparatus for recording and/or reproducing multi-track tapes, comprising the tape head of claim 1.

10. A method of fabrication of a tape head with a closure, the method comprising:
  providing:
    a body with a tape-bearing surface configured to contact a magnetic tape, the body comprising at least one transducer that is a read element or a write element, configured so as for the tape head to read from or write to the tape, in operation; and
    a monobloc closure, having a structured cross-sectional profile, so as to exhibit:
      a contact part, having a first top surface;
      a breakable part, having a second top surface; and
      a connecting part connecting the breakable part to the contact part, wherein the connecting part:
        has a third top surface recessed from said first top surface, perpendicularly to a contact plane defined by said tape-bearing surface, so as to not to contact the tape, in operation; and comprises a line of mechanical weakness extending across said third top surface;

arranging the body and the closure on a reference surface, so as for each of the tape-bearing surface, the first top surface and the second top surface to contact the reference surface;

fixing the contact part on a side of the body, which side adjoins the tape-bearing surface at an edge thereof; and removing the breakable part by breaking along the line of mechanical weakness, to obtain a tape head wherein said first surface is level with the tape-bearing surface.

11. The method of claim 10, wherein, at fixing, said side is a leading side or a trailing side of the body, wherein said leading side and said trailing side adjoin, each, the tape-bearing surface.

12. The method of claim 10, wherein providing the monobloc closure comprises structuring the cross-sectional profile of the closure so as for the contact part to have a step-like cross-sectional profile, exhibiting a riser between two treads that are respectively formed by the first top surface and a recessed surface, the latter recessed from the first top surface so as not to contact the magnetic tape, in operation.

13. The method of claim 12, wherein structuring the cross-sectional profile of the closure is carried out so as for the recessed surface to be recessed from the first top surface by a distance h corresponding to a height of the riser, wherein h is between 1 and 10 microns, a width w of the recessed surface along a direction parallel to a longitudinal direction z of circulation of the tape being between 10 and 50 microns.

14. The method of claim 12, wherein structuring the cross-sectional profile of the closure comprises:

providing a substrate;

coating the substrate provided with a photoresist;

lithographically patterning the photoresist; and transferring the photoresist pattern accordingly obtained into the substrate, to obtain said step-like cross-sectional profile of the contact part.

15. The method of claim 14, wherein:

the substrate provided is an Aluminum-Titanium carbide substrate, or AlTiC substrate; and the photoresist pattern is transferred by reactive ion etching.

16. The method of claim 1, wherein structuring the cross-sectional profile of the closure further comprises obtaining the connecting part by cutting partially through a depth of the provided substrate with a wafer saw, up to a level of said third top surface.

17. The method of claim 16, wherein structuring the cross-sectional profile of the closure further comprises obtaining the line of mechanical weakness by cutting partially through a depth of the obtained connecting part, through the third top surface.

18. The method of claim 17, wherein cutting partially through the depth of the connecting part is carried out so as to obtain a residual thickness of the connecting part at the level of the line of mechanical weakness that is between 30 and 70 microns.

19. The method of claim 10, wherein fixing comprises applying a glue on the contact part and/or on said side of the body and curing the applied glue.

20. The method of claim 10, wherein fixing is performed while applying a load on the body and the closure arranged on the reference surface.

* * * * *